US010278087B2

(12) United States Patent
Țenea et al.

(10) Patent No.: US 10,278,087 B2
(45) Date of Patent: Apr. 30, 2019

(54) CORRELATING TAPPED GENERAL PACKET RADIO SERVICE (GPRS) TUNNELING PROTOCOL (GTP) AND NON-GTP PACKETS FOR A SUBSCRIBER'S SESSION FOR LOAD BALANCING AND FILTERING MONITORED TRAFFIC IN A MOBILE NETWORK

(71) Applicant: Ixia, Calabasas, CA (US)

(72) Inventors: Bogdan Țenea, Bucharest (RO); Robin Lee O'Connor, Austin, TX (US); Shardendu Pandey, Cedar Park, TX (US); Alan Richard Schwenk, Raleigh, NC (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 0 days.

(21) Appl. No.: 15/721,073

(22) Filed: Sep. 29, 2017

(65) Prior Publication Data

US 2019/0098522 A1    Mar. 28, 2019

(30) Foreign Application Priority Data

Sep. 26, 2017   (RO) .................................... 17-00727

(51) Int. Cl.
*H04W 8/02* (2009.01)
*H04W 24/08* (2009.01)
*H04L 12/26* (2006.01)
*H04L 12/46* (2006.01)

(52) U.S. Cl.
CPC .......... *H04W 24/08* (2013.01); *H04L 43/028* (2013.01); *H04L 43/04* (2013.01); *H04L 43/12* (2013.01)

(58) Field of Classification Search
None
See application file for complete search history.

(56) References Cited

U.S. PATENT DOCUMENTS

| 7,865,944 | B1 * | 1/2011 | Shu ......................... | H04L 63/30 726/11 |
| 8,018,955 | B2 * | 9/2011 | Agarwal ................. | H04W 4/02 370/401 |
| 8,583,109 | B2 * | 11/2013 | Gillot ..................... | H04W 8/12 455/432.1 |

(Continued)

OTHER PUBLICATIONS

"Ixia GTP Session Controller 7433," Ixia Data Sheet, 915-6606-01-2161 Rev D, www.ixiacom.com, pp. 1-6 (Aug. 2017).

(Continued)

*Primary Examiner* — Eunsook Choi

(57) ABSTRACT

The subject matter described herein includes methods, systems, and computer readable media for correlating, load balancing and filtering tapped GTP and non-GTP packets. One method for correlating, load balancing and filtering tapped GTP and non-GTP packets includes receiving GTP packets tapped from a plurality of GTP network tap points. The method further includes receiving non-GTP packets tapped from at least one non-GTP network tap point. The method further includes correlating GTP packets with non-GTP packets for a particular subscriber. The method further includes forwarding the GTP packets and non-GTP packets correlated for the particular subscriber to a network monitoring tool.

20 Claims, 9 Drawing Sheets

(56) References Cited

U.S. PATENT DOCUMENTS

| | | | | |
|---|---|---|---|---|
| 10,057,126 | B2* | 8/2018 | Vedam | H04L 41/0886 |
| 2009/0129271 | A1* | 5/2009 | Ramankutty | H04L 12/66 |
| | | | | 370/235 |
| 2011/0075557 | A1* | 3/2011 | Chowdhury | H04L 12/14 |
| | | | | 370/230 |
| 2013/0097329 | A1* | 4/2013 | Alex | H04L 61/1511 |
| | | | | 709/228 |

OTHER PUBLICATIONS

"Application Note: Subscriber-Aware Visibility—Rethinking Operator Infrastructure Monitoring," Gigamon 4092-01, pp. 1-21 (Nov. 2016).

Bhardwaj, "Technology Primer on "Understanding the Different Aspects of LTE and Its Impact in Various Areas"," Accessed from wayback machine https://web.archive.org/web/20160620183436/https://www.syniverse.com/assets/files/custom_content/understanding-different-aspects-lte.pdf, pp. 1-32 (Jun. 20, 2016).

Suthar, "Designing LTE with IPv6," Cisco Systems Inc., pp. 1-34 (2010).

\* cited by examiner

| IMSI—port to use | | |
|---|---|---|
| S11 uplink | S11 downlink | |
| S5 D uplink | S5 D downlink | |
| S5 C uplink | S5 C downlink | |
| S1 uplink | S1 downlink | |
| S1 ded. uplink | S1 ded. downlink | |

FIG. 5

```
> Frame 5: 247 bytes on wire (1976 bits), 247 bytes captured (1976 bits)
> Ethernet II, Src: Sunix_00:64:00 (00:0a:0a:00:64:00), Dst: Sunix_00:c9:00 (00:0a:0a:00:c9:00)
> Internet Protocol Version 4, Src: 10.10.0.100, Dst: 10.10.0.101
> User Datagram Protocol, Src Port: 2123, Dst Port: 2123
> GPRS Tunneling Protocol V2
  v Create Session Request
    > Flags: 0x48
      Message Type: Create Session Request (32)
      Message Length: 201
      Tunnel Endpoint Identifier: 0x00000000 (0)
      Sequence Number: 0x00000001 (1)
      Spare: 0
    > International Mobile Subscriber Identity (IMSI) : 226041000000003
    > MSISDN : 40700000003
    > Mobile Equipment Identity (MEI) : 9999000000000030
    > User Location Info (ULI) : TAI ECGI
    > Serving Network : MCC 226 Romania, MNC 10 Orange
    > UE Time Zone ;
    > RAT Type : EUTRAN (6)
    > Fully Qualified Tunnel Endpoint Identifier (F-TEID) : S11 MME GTP-C interface, TEID/GRE Key: 0x0325aa23, IPv4 10.10.0.100
    > Fully Qualified Tunnel Endpoint Identifier (F-TEID) : S5/S8 PGW GTP-C interface, TEID/GRE Key: 0x00000000, IPv4 20.0.0.1
    > PDN Type : IPv4
    > Selection Mode : MS or network provided APN, subscribed verified
    > PDN Address Allocation (PAA) :
    > Access Point Name (APN) : apn-1.ixiacom.com
```

FIG. 6

| IMSI – port to use and TEIDs |
|---|
| S11 uplink |
| S5 D uplink |
| S5 C uplink |
| S1 uplink |
| S1 ded. up |
| S11 downlink |
| S5 D downlink |
| S5 C downlink |
| S1 downlink |
| S1 ded. dl |
| Subscriber IP address |

FIG. 7

```
Frame 10: 172 bytes on wire (1376 bits), 172 bytes captured (1376 bits)
Ethernet II, Src: Sunix_00:c9:00 (00:0a:00:c9:00), Dst: Sunix_00:64:00 (00:0a:00:00:64:00)
Internet Protocol Version 4, Src: 10.10.0.201, Dst: 10.10.0.100
User Datagram Protocol, Src Port: 2123, Dst Port: 2123
GPRS Tunneling Protocol v2
Create Session Response
  Flags: 0x48
  Message Type: Create Session Response (33)
  Message Length: 136
  Tunnel Endpoint Identifier: 0x0325aa23 (52800035)
  Sequence Number: 0x00000001 (1)
  Spare: 0
  Cause : Request accepted (16)
  PDN Address Allocation (PAA) :
    IE Type: PDN Address Allocation (PAA) (79)
    IE Length: 5
    0000 .... = CR flag: 0
    .... 0000 = Instance: 0
    .... ..001 = PDN Type: IPv4 (1)
    PDN Address and Prefix(IPv4): 172.16.0.103
  Fully Qualified Tunnel Endpoint Identifier (F-TEID) : S11/S4 SGW GTP-C interface, TEID/GRE Key: 0x00000003, IPv4 10.10.0.201
  Fully Qualified Tunnel Endpoint Identifier (F-TEID) : S5/S8 PGW GTP-C interface, TEID/GRE Key: 0x00000003, IPv4 20.0.0.1
  APN Restriction : value 0
```

FIG. 8

| IMSI | TEIDs | Mobile IP | Assigned Tool Port |
|---|---|---|---|
| IMSI x | TEID y, w | IP z | Tool Port A |

FIG. 9

CORRELATING TAPPED GENERAL PACKET RADIO SERVICE (GPRS) TUNNELING PROTOCOL (GTP) AND NON-GTP PACKETS FOR A SUBSCRIBER'S SESSION FOR LOAD BALANCING AND FILTERING MONITORED TRAFFIC IN A MOBILE NETWORK

PRIORITY CLAIM

This application claims the priority benefit of Romanian Patent Application Serial No. a 2017 00727, filed Sep. 26, 2017, the disclosure of which is incorporated herein by reference in its entirety.

TECHNICAL FIELD

The subject matter described herein network visibility. More particularly, the subject matter described herein relates to correlating and filtering tapped GTP and non-GTP packets using network visibility components, in a mobile core network designed to transport subscriber data traffic.

BACKGROUND

GTP is a tunneling protocol used in mobile core networks to allow subscriber mobility. For example, referring to FIG. 1, when a subscriber terminal 100 attaches to an e-Node B 102, GTP tunnels are established between the Mobility Management Entity (MME) 108, and Serving Gateway (S-GW) 104, and between the Serving Gateway (S-GW) 104, add the Packet Data Network Gateway (P-GW) 106. These tunnels are established by creating a session for the subscriber when he attaches to the network, building a data plane connection (shown in purple in FIG. 1) and encapsulating that data into GTP tunnels. The tunnels have various tunnel identifiers (TEIDs) along the path, associated with the temporary subscriber session, and are maintained by a control plane connection between the nodes (shown in black in FIG. 1). The control plane connection is formed, in order, between the subscriber User Equipment (UE) 100 and eNodeB 102, between eNodeB 102 and MME 108 (named S1-MME interface), between MME 108 and the Home Subscriber Server (HSS) 110 (named S6a interface), between MME 108 and SGW 104 (named S11 interface) and between SGW 104 and PGW 106 (named S5/8 interface).

It should be noted that GTP user plane tunnels only exist between the eNodeB and the S-GW on the S-GW side of PGW 106 but not on the packet network side of P-GW 106. As a result, there are no GTP TEIDs on the packet network side of P-GW 106.

In order to obtain a complete view of the network for performance monitoring or debugging, or other purposes, passive optical or electrical network taps may be placed at any or all of the interfaces illustrated in FIG. 1. These network taps may passively copy packets from the various interfaces, and send the tapped packets to a load balancer or filter for intermediate processing before it is sent to network visibility tools. Standard load balancers operate on the outer IPs and ports of the packets, are inefficient in these contexts, as because it is encapsulated and carries the outer IPs of the EPC notes, traffic for one subscriber can end up on multiple probes. Advanced load balancers can either operate stateless on the subscriber inner-IP of the GTP packets, making sure that at least the user plane for a session end on the same tool while generally flooding GTP control plane, or can go a step further and correlate GTP control and user plane sessions with each other, and forward the corresponding packets for a given subscriber to the same tool. Accordingly, there exists a need and it is of great value to correlate and filter tapped GTP and non-GTP packets using network visibility components

SUMMARY

The subject matter described herein includes methods, systems, and computer readable media for correlating and filtering tapped GTP and non-GTP packets. One method for correlating and filtering tapped GTP and non-GTP packets includes receiving monitored traffic tapped from a plurality of network tap points. The method further includes receiving non-GTP packets tapped from at least one non-GTP network tap point. The method further includes correlating GTP packets with non-GTP packets for a particular subscriber. The method further includes forwarding the GTP packets and non-GTP packets correlated for the particular subscriber to a network monitoring tool.

A system for correlating and filtering tapped GTP and non-GTP packets includes a GTP and non-GTP correlator having at least one processor. The GTP and non-GTP packet correlator further includes a GTP and non-GTP correlation module implemented by the at least one processor for receiving GTP packets tapped from a plurality of GTP network tap points, for receiving non-GTP packets tapped from at least one non-GTP network tap point, for correlating GTP packets with non-GTP packets for a particular subscriber, and for forwarding the GTP packets and non-GTP packets correlated for the particular subscriber to a specific network monitoring tool.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 5 is a diagram illustrating an exemplary GTP correlator subscriber or session table entry;

FIG. 6 is a diagram illustrating exemplary parameters from a Create Session message that may be used to derive some of the table entries in FIG. 5;

FIG. 7 is a diagram illustrating an exemplary GTP table entry including a subscriber IP address for identifying and correlating non-GTP packets for a subscriber;

FIG. 8 is a diagram illustrating exemplary parameters from a Create Session message that may be used to derive some of the table entries in FIG. 7; and FIG. 9 is a table illustrating exemplary binding information that may be stored by correlation module 204 for correlating GTP and non-GTP packets for a particular subscriber.

DETAILED DESCRIPTION

Figure 1:
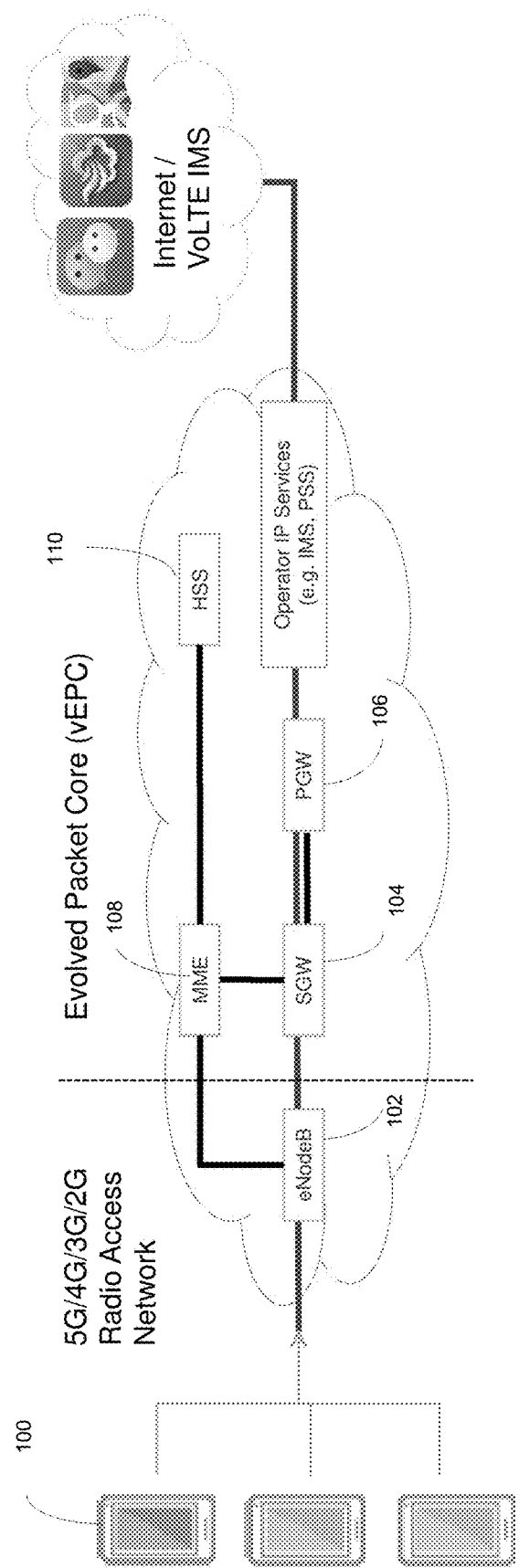
FIG. 1 is a network diagram illustrating network in which GTP and non-GTP packet correlation may be implemented.
Figure 2:
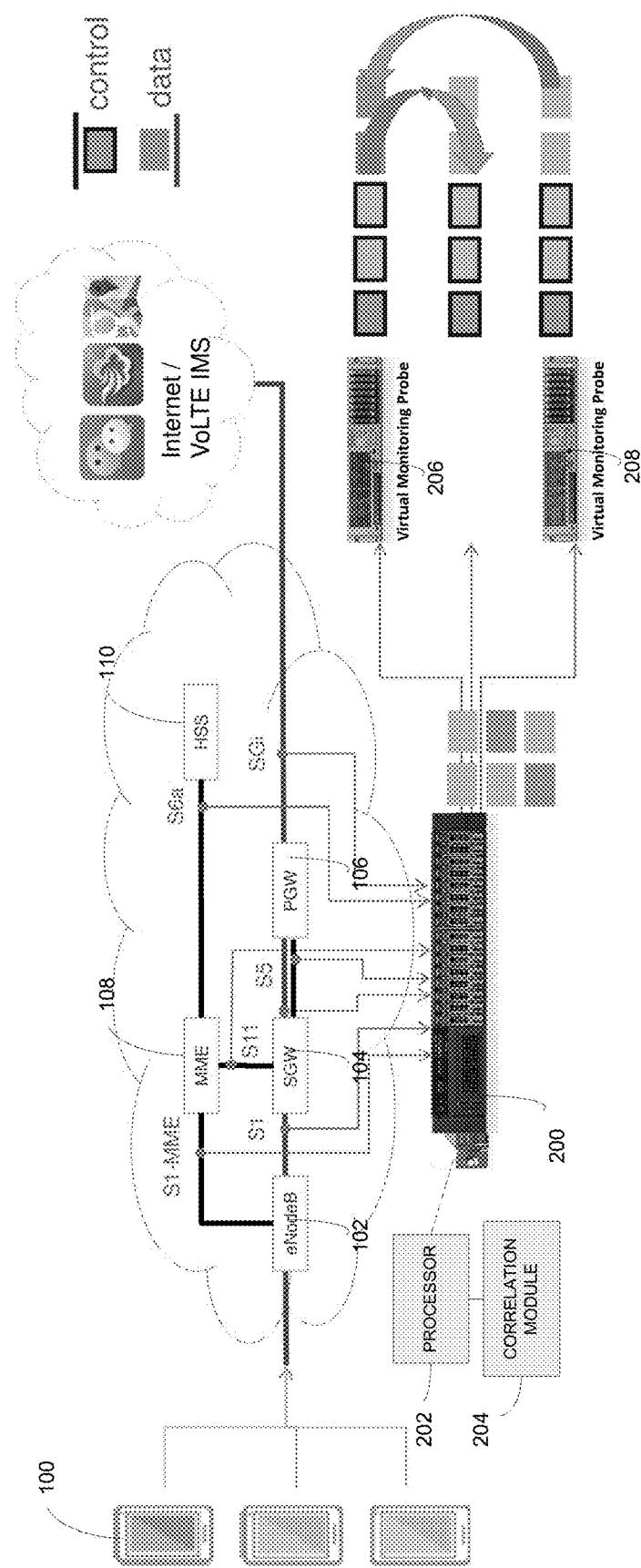
FIG. 2 is a network diagram illustrating a GTP and non-GTP packet correlator for filtering and correlating tapped GTP and non-GTP packets.

The subject matter described herein includes methods, systems, and computer readable media for filtering and correlating tapped GTP and non-GTP packets for a subscriber's session, for the purpose of load balancing and filtering monitored traffic in a mobile network. FIG. 2 illustrates an exemplary GTP and non-GTP packet correlator. In FIG. 2, a GTP and non-GTP packet correlator 200 comprises a computing platform including at least one processor 202 a correlation module 204 implemented by the at least one processor 202. Correlator 200 also includes a plurality of ports for receiving tapped GTP and non-GTP packets from the various tap points in the illustrated network. Correlation module 204 receives the tapped GTP and non-GTP packets, correlates GTP packets and non-GTP packets for a particular subscriber, and forwards the GTP packets and non-GTP packets correlated for the particular subscriber to a network monitoring tool, such as monitoring probes 206, 208 and 210.

Correlation module 204 may receive tapped packets from any of the interfaces illustrated in FIG. 2, including, but not limited to, S11, S5/8, S1-U, S1-MME, S6a, SGi, Gn and Gi. In one implementation, correlation module 204 may correlate GTP packets received for a subscriber on the S1-U, S11 or S5/8 interfaces, with non-GTP EPC packets on S1-MME and S6a with non-GTP plain IP packets for the subscriber received over the SGi or Gi interface.

Figure 3:
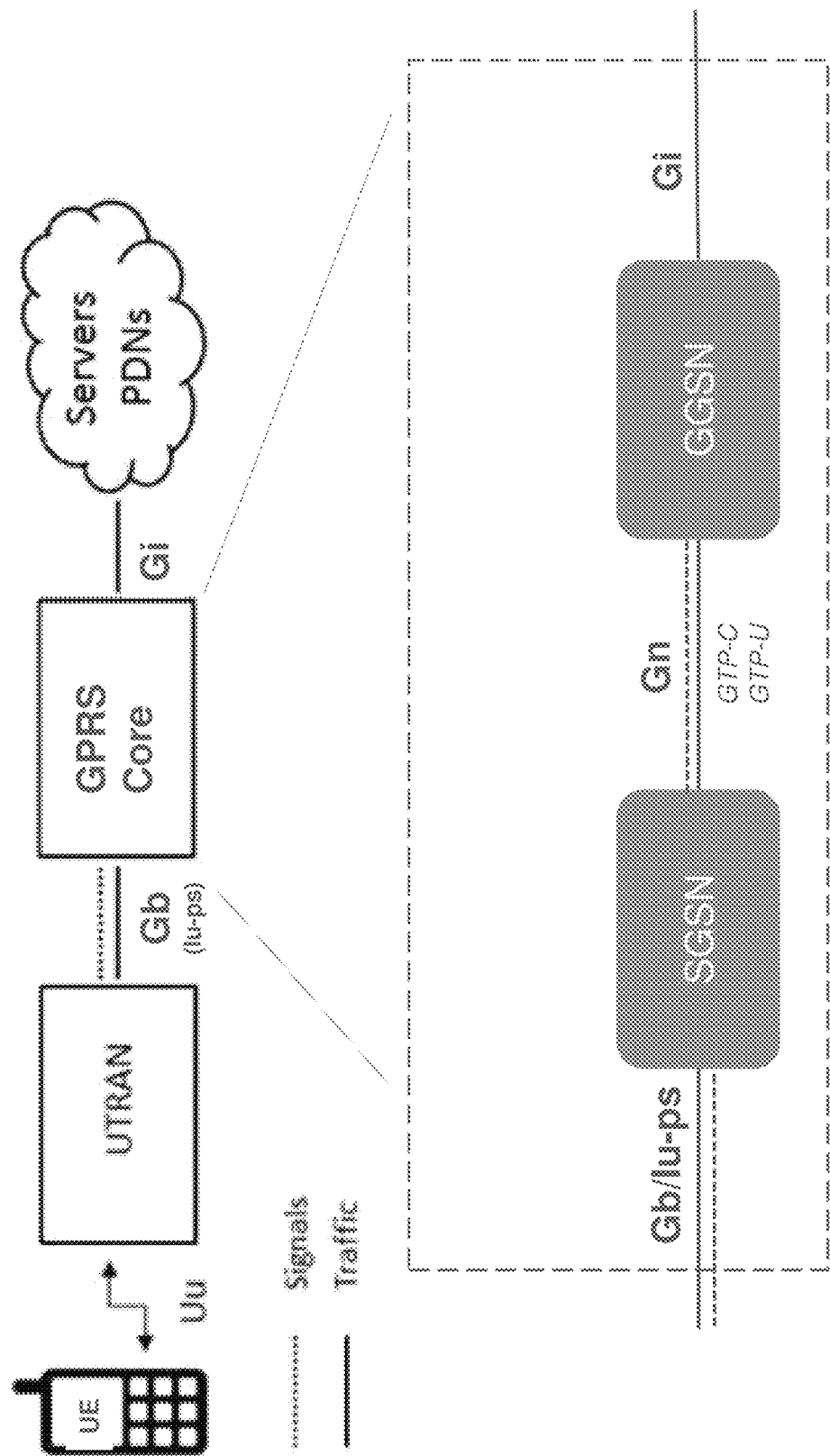
FIG. 3 is a network diagram illustrating additional or alternate interfaces, that as example applies the same mechanism to 3G networks, from which a correlator may receive tapped packets and correlate such packets.

FIG. 3 is a network diagram illustrating additional or alternate interfaces, that as example applies the same mechanism to 3G networks, from which correlation module 204 may receive tapped packets and correlate such packets.

Figure 4:
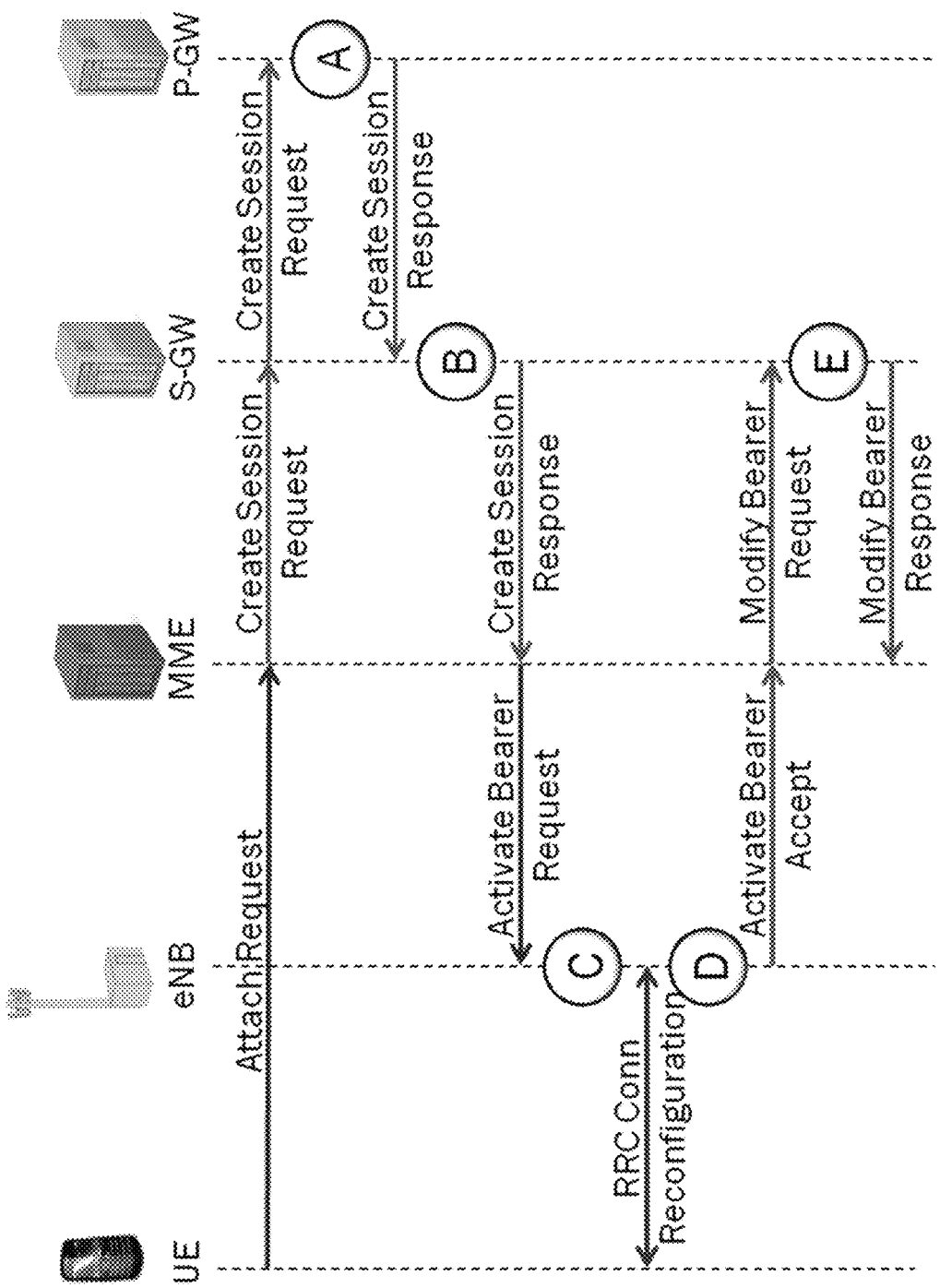
FIG. 4 is a message flow diagram illustrating exemplary GTP session setup message from which a correlator as described herein can derive a non-GTP pseudo tunnel endpoint identifier for identifying and correlating non-GTP packets with GTP packets for a subscriber.

In one example, correlation module 204 may obtain a pseudo tunnel endpoint identifier, such as the subscriber IP address for that session, from GTP control messages. FIG. 4 is a message flow diagram illustrating exemplary session setup message from which a correlator as described herein can derive a non-GTP pseudo tunnel endpoint identifier for identifying and correlating non-GTP packets for a subscriber. In FIG. 4, when a UE attaches to an eNodeB, the UE sends an Attach Request to the MME via the eNodeB. The MME sends a Create Session Request to the S-GW, which sends a Create Session Request to the P-GW. The P-GW sends a Create Session Response to the S-GW. The Create Session Response includes the IP address assigned to the subscriber. Correlation module 204 may extract the assigned IP address from the Create Session message and use the IP address to identify subsequent non-GTP packets for the subscriber.

In one implementation, correlation module 204 builds a GTP session table and uses the GTP subscriber or session table to identify and forward GTP packets to a particular tool port. FIG. 5 illustrates an example of a GTP table entry that may be generated by correlation module 204 to monitor GTP packets for a particular subscriber. In the table, the IMSI is used to identify the subscriber on the various interfaces. The outbound port may be selected based on tool capacity. If a handover to another eNodeB occurs, the table is updated with tunnel identification information for the new eNodeB. FIG. 6 is a diagram illustrating exemplary parameters from a Create Session message that may be used to derive the table entry in FIG. 5. In FIG. 6, the Create Session message includes the IMSI, MSISDN, IMEI, and Sequence number that can be used to identify particular subscriber and his session. The message also includes the TEIDs—tunnel endpoint identifiers, which can also be used to identify tunneled packets associated with that subscriber's session.

FIG. 7 is a diagram illustrating an exemplary GTP table entry including a subscriber IP address for identifying and correlating non-GTP packets for a subscriber. FIG. 8 is a diagram illustrating exemplary parameters from a Create Session message that may be used to derive the table entry in FIG. 7. Correlation module 204 may use the subscriber IP address as an identifier on SGi or Gi interface to associate the subscriber to a session. The IP address is allocated to the subscriber in the Create Session Response in the PDN Address Allocation (PAA) header and can be used as a pseudo TEID for correlating packets to a session belonging to the subscriber. Using the IP address, to correlate back to a subscriber's is not trivial, because for SGi and Gi packets, which are plain IP, it may be difficult to determine which IP source and destination addresses in a packet is the subscriber IP and which is the remote host IP. As will be described in detail below, additional parameters associated with non-GTP packets may be used to determine whether to use the source IP address, the destination IP address, or both when correlating non-GTP packets.

The following steps may be implemented by correlation module 204 in correlating GTP and non-GTP packets for a subscriber.

1. Observe GTP-C packets, extract subscriber ID (e.g., IMSI, IMEI or MSISDN), TEIDs, subscriber IP from PAA and other relevant information.

2. Decide based on various filters and rules if the subscriber, the session, and which of its bearers, are to be monitored.

3. If deciding to monitor, assign the subscriber and the bearers to a specific tool connected on a specific port or port group.

4. Create and store a binding that associates ID, TEID and tool port/port group.

5. Forward all GTP-C packets associated with the same subscriber to the same tool port/port group 6. For GTP-U packets, locate TEID and send traffic to the port associated with the subscriber that TEID is associated to 7. Associate an IP address with a subscriber, either by obtaining the IP address from the Create Session and Create PDP Context or other GTP-C messages, or by inspecting the inner subscriber IP address within the GTP-U messages 8. Receive copies of targeted non-GTP packet traffic (including SIP packets, RTP packets) from the tapped Gi or SGi interface.

9. Examine IP addresses of non-GTP packets. If the uplink and downlink of the non-GTP traffic can be identified, either by physical input port, VLAN, or some other method, query either source IP or destination IP based on direction, in the correlation table, to find the respective subscriber and the associated port or port group.

10. Otherwise query the correlation table for both source and destination IP and determine if there is a match. Querying by destination first is recommended as it is expected there will be more downlink than uplink traffic.

11. If matching binding entry is located, then forward the associated non-GTP packet to the corresponding tool port/port group identified in the matching binding entry.

In this way, received non-GTP packet traffic is efficiently classified based on subscriber and sent to the same tool port/port group as the GTP session traffic for the associated subscriber, if the associated subscriber was considered for monitoring on the session or bearer creation.

FIG. 9 is a table illustrating exemplary binding information that may be stored by correlation module 204 for correlating GTP and non-GTP packets for a particular subscriber. In FIG. 9, the packets include the TEIDs for GTP packets and the mobile IP address and IMSI for non-GTP packets. The tool port for the packets may also be stored as part of the binding record. The tool port is associated with the network monitoring tool to which the packets will be forwarded.

Two exemplary methods that may be used by correlation module 204 in correlating non-GTP packets will now be described.

Method 1
1. Build correlation table associating TEID to subscriber based on intercepting GTP control plane messages, and associate the subscriber to a port if subscriber is to be monitored
2. On Create Session message store the IP address of the subscriber from PAA in the correlation table
3. Intercept monitored traffic that is not GTP control plane
4. If packet is GTP user plane, forward based on TEID information
5. If packet is non-GTP, continue to step 6 to try to correlate
6. Determine which of which of IP Source Address and IP Destination belongs to a subscriber.
7. If possible use the input port, VLAN, or IP address by checking it is in a specific configured subnet or subnets which used for subscriber addresses, or other marker to differentiate between uplink and downlink, to determine which could be the subscriber IP, and search for that in the correlation table.
8. If not possible to differentiate between uplink and downlink, do two lookups in the correlation table and checking both source and destination IP for match. Querying by destination IP first is recommended as it is expected there will be more downlink than uplink traffic due to the nature of mobile networks and subscriber behavior.
9. Forward traffic to the monitoring tool based on the associated subscriber with that IP, if the IP is found in the correlation table.
10. If no subscriber matches the IP address, drop the packet or load balance it to configured non-session port or port-groups.

Method 2
1. Build correlation table associating TEID to subscriber based on intercepting GTP control plane messages, and associate the subscriber to a port if subscriber is to be monitored.
2. Intercept monitored traffic that is GTP user plane
   a) If not done already, extract subscriber IP from a GTP-U packet and associate to subscriber owning the respective TEID in correlation table
   b) Forward the GTP-U packet based on TEID information
3. If the packet is non-GTP, continue to step 4 and try to correlate
4. Determine which of which of IP Source Address and IP Destination belongs to a subscriber:
   a) If possible use the input port, VLAN, or IP address by checking it is in a specific configured subnet or subnets which used for subscriber addresses, or other marker to differentiate between uplink and downlink, to determine which could be the subscriber IP, and search for that in the correlation table.
   b) If not possible to differentiate between uplink and downlink, do two lookups in the correlation table and checking both source and destination IP for match. Querying by destination IP first is recommended as it is expected there will be more downlink than uplink traffic due to the nature of mobile networks and subscriber behavior.
5. Forward traffic to the monitoring tool based on the associated subscriber with that IP, if the IP is found in the correlation table.
6. If no subscriber matches the IP address, drop the packet or load balance it to configured non-session port or port-groups.

According to another aspect of the subject matter described herein, correlation module 204 may filter IP addresses based on ranges to determine whether or not to perform a lookup in the correlation table for an IP address extracted from a non-GTP packet. If a received packet does not include an IP address that is within a particular range, a lookup based on that IP address may be bypassed.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for correlating and filtering tapped general packet radio service (GPRS) tunneling protocol (GTP) and non-GTP packets, the method comprising:
receiving GTP packets tapped from a plurality of GTP network tap points;
receiving non-GTP packets tapped from at least one non-GTP network tap point; and
correlating GTP packets with non-GTP packets for a particular subscriber; and
forwarding the GTP packets and non-GTP packets correlated for the particular subscriber to a chosen network monitoring tool.

2. The method of claim 1 wherein receiving the GTP packets includes receiving GTP control plane and/or GTP user plane packets.

3. The method of claim 1 wherein the GTP packets are received from at least one of an S11, S5/8, S12, S4 or Gn interface and wherein the non-GTP packets are received from at least one of a Gi or SGi interface.

4. The method of claim 1 wherein correlating the GTP and non-GTP packets includes identifying an IP address for the subscriber from a GTP control plane message and using the IP address as a pseudo tunnel endpoint identifier to identify non-GTP packets involving the subscriber.

5. The method of claim 1 wherein correlating the GTP and non-GTP packets includes comparing at least one IP address in the non-GTP packets to a table of IP addresses stored as pseudo tunnel endpoint identifiers.

6. The method of claim 5 comprising using at least one parameter associated with the non-GTP packets to determine whether to perform a lookup in the table based on a source IP address, a destination IP address or both the source and destination IP addresses in a non-GTP packets.

7. The method of claim 1 comprising filtering the GTP and non-GTP packets to be correlated based on session or subscriber attributes.

8. The method of claim 1 comprising filtering the GTP and non-GTP packets to be correlated based on bearer attributes.

9. The method of claim 1 wherein correlating the GTP and non-GTP packets includes using a GTP tunnel endpoint identifier to identify the GTP packets.

10. The method of claim 1 wherein forwarding the GTP and non-GTP packets to a network monitoring tool includes forwarding GTP and non-GTP packets associated with the same session to the network monitoring tool.

11. A system for correlating and filtering tapped General Packet Radio Service (GPRS) Tunneling Protocol (GTP) and non-GTP packets, the system comprising:
  a GTP and non-GTP packet correlator, the GTP and non-GTP correlator including:
    at least one processor; and
    a GTP and non-GTP correlation module implemented by the at least one processor for receiving GTP packets tapped from a plurality of GTP network tap points, for receiving non-GTP packets tapped from at least one non-GTP network tap point, for correlating GTP packets with non-GTP packets for a particular subscriber, and for forwarding the GTP packets and non-GTP packets correlated for the particular subscriber to a network monitoring tool.

12. The system of claim 11 wherein receiving the GTP packets includes receiving GTP control plane and GTP user plane packets.

13. The system of claim 11 wherein the GTP packets are received from at least one of an S11, S5/8, S12, S4 or Gn interface and wherein the non-GTP packets are received from at least one of a Gi or SGi interface.

14. The system of claim 11 wherein correlating the GTP and non-GTP packets includes identifying an IP address for the subscriber from a GTP control plane message and using the IP address as a pseudo tunnel endpoint identifier to identify non-GTP packets involving the subscriber.

15. The system of claim 11 wherein correlating the GTP and non-GTP packets includes comparing at least one IP address in the non-GTP packets to a table of IP addresses stored as pseudo tunnel endpoint identifiers.

16. The system of claim 15 comprising using at least one parameter associated with the non-GTP packets to determine whether to perform a lookup in the table based on a source IP address, a destination IP address or both the source and destination IP addresses in a non-GTP packets.

17. The system of claim 11 comprising filtering the GTP and non-GTP packets to be correlated based on bearer type.

18. The system of claim 11 wherein correlating the GTP and non-GTP packets includes using a GTP tunnel endpoint identifier to identify the GTP packets.

19. The system of claim 11 wherein forwarding the GTP and non-GTP packets to a network monitoring tool includes forwarding GTP and non-GTP packets associated with the same session to the network monitoring tool.

20. A non-transitory computer readable medium having stored thereon executable instructions that when executed by a processor of a computer control the computer to perform steps comprising:
  receiving GTP packets tapped from a plurality of GTP network tap points;
  receiving non-GTP packets tapped from at least one non-GTP network tap point; and
  correlating GTP packets with non-GTP packets for a particular subscriber; and
  forwarding the GTP packets and non-GTP packets correlated for the particular subscriber to a network monitoring tool.

* * * * *